United States Patent

Toensing

[15] 3,706,424

[45] Dec. 19, 1972

[54] STOP CONTROL FOR A REEL TO REEL DRIVE MECHANISM

[72] Inventor: Eyvand E. Toensing, Minneapolis, Minn.

[73] Assignee: Audiomatic Techniques Inc., Minneapolis, Minn.

[22] Filed: Nov. 25, 1970

[21] Appl. No.: 92,556

[52] U.S. Cl. ..................242/191, 200/61.17, 242/57
[51] Int. Cl. ..........................B65h 63/02, B65h 25/32
[58] Field of Search......242/191, 186, 189, 190, 198, 242/199, 200, 197, 210, 201, 202, 206, 208, 207, 57, 54; 200/61.17

[56] References Cited

UNITED STATES PATENTS 3,488,017 1/1970 Schatteman..........................242/191
3,141,625 7/1964 Namenyi-Katz......................242/204

*Primary Examiner*—George F. Mautz
*Attorney*—William J. McGinnis, Jr.

[57] ABSTRACT

A tape transport stop control for a tape drive mechanism in which a pair of sensors sense the movement of the tape at two spaced apart positions, such as by sensing movement of the take-up reel and the supply reel, respectively. The tape drive is stopped when either sensor fails to sense tape movement. The sensors associated with tape movement periodically cause a bistable flip flop to operate between its respective stable states in response to output signals associated with tape movement. When the flip flop remains in a stable state for a predetermined time interval, the drive mechanism is stopped.

4 Claims, 3 Drawing Figures

PATENTED DEC 19 1972

3,706,424

INVENTOR.
EYVAND E. TOENSING

BY

Burd Braddock & Bartz

ATTORNEYS

STOP CONTROL FOR A REEL TO REEL DRIVE MECHANISM

BACKGROUND OF THE INVENTION

1. Field of the Invention

The subject of this invention is transport systems such as are found in tape recorders and tape playback units. It will be appreciated that a tape recorder must have a stop control for the drive mechanism effective to cause the stoppage of the drive mechanism when the tape is fully wound in the forward direction or rewound in the reverse direction or when the tape breaks or is otherwise obstructed. This invention relates to a stop control for the drive mechanism of a tape recorder which is responsive to the interruption of tape movement with motion sensors in more than one location.

2. Description of the Prior Art

Some prior art stop control mechanisms operated to stop the drive mechanism of a tape recorder using a photoelectric cell to detect the presence of a clear leader after the coated magnetic tape had passed the location thereof. Another similar system, also employing only a single sensing unit, operated when a foil leader appeared after the passage of the coated magnetic tape. However, different manufacturers of tape use different systems and a tape recorder must be able to use tapes employing a variety of systems interchangeably rather than force the user of a tape recorder to buy tapes only from one source. This is especially true in the use of cassette type recorders since the tape cassette cartridges are not made according to a universal standard at this time. Thus a tape cassette user might be forced to buy cassette cartridges from the manufacturer or distributor of his machine and would not be able to as easily use cartridges from another manufacturer in his machine. This is a consideration when tape playback cartridges are being employed in such systems as school instructional programs.

SUMMARY OF THE INVENTION

This invention provides a pair of motion sensors located at different points in the path of tape travel in a tape recorder to determine that the tape is in motion when the drive mechanism is operating. In this embodiment of the invention, the sensors are associated with a take-up reel and a supply reel, respectively, of the tape recorder so as to sense rotational movement of the reels. The motion sensors are in turn connected to separate inputs of a bistable flip flop and produce signals which cause the flip flop to alternate between its respective stable states so long as both the supply reel and the take-up reel are in motion. When either sensor ceases to produce signals indicative of tape motion, then the flip flop will remain in one of its stable states. The output of the flip flop is connected to a time delay which causes stoppage of the drive mechanism when the flip flop remains in a stable state for a certain predetermined period of time.

It will be appreciated that this invention will have generally application in transport systems by providing two motion sensing units at remote points, either of which will operate a stop mechanism when the transported member ceases movement. IN THE DRAWINGS.

Figure 1:
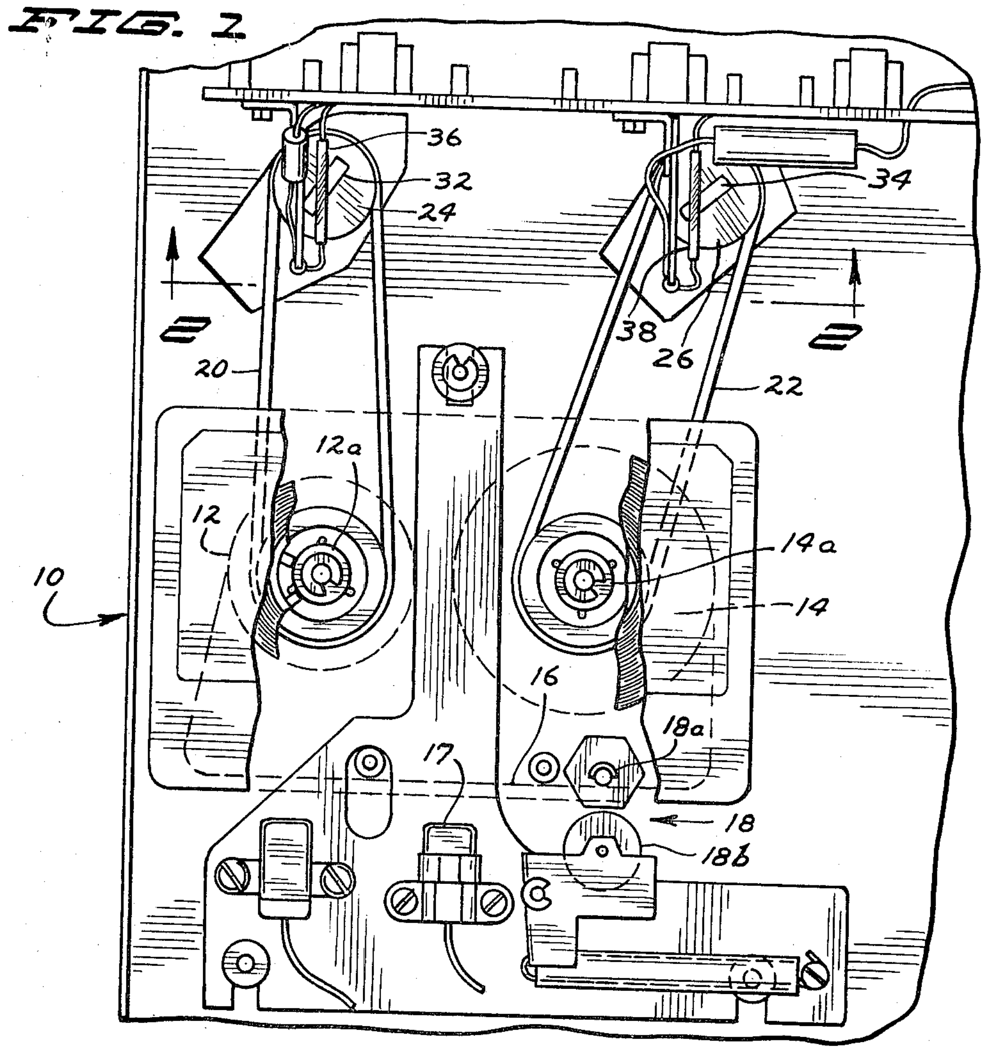
FIG. 1 is a top plan view of a tape recorder embodying the invention.

DESCRIPTION OF THE PREFERRED EMBODIMENT:

Referring now to FIG. 1, a tape recorder 10 has a tape supply reel 12 and a tape take-up reel 14 removably positioned on and driven by hubs 12*a* and 14*a* respectively. Magnetic recording tape 16 passes from the supply reel 12 to the take-up reel 14 past a record playback head 17 and through a drive system, generally designated 18. The drive system 18 has a motor driven capstan and an idler wheel 18*b* which is used to drive the tape in the record or playback mode to maintain accurate speed control with the take-up reel providing a light tensioning. The take-up reel is driven when the tape recorder is used in the fast forward mode. It will be appreciated that the functions of the reels 12 and 14 are reversed when the tape recorder is in a rewind mode, reel 12 becoming a takeup reel and reel 14 becoming a tape supply reel.

Hubs 12*a* and 14*a* are driven through drive belt pairs 20 and 22, respectively, by pulleys 24 and 26 respectively. The pulleys 24 and 26 are driven by electric motors 28 and 30, respectively. Embedded in pulleys 24 and 26 are bar magnets 32 and 34 which drive magnetic reed switches 36 and 38, respectively, located relatively closely above the pulleys. The rotating bar magnets, associated with rotation of the tape reels 12 and 14 and movement of magnetic tape therebetween, cause the making and breaking of the circuit in which the reed switches are placed.

Figures 2, 3:
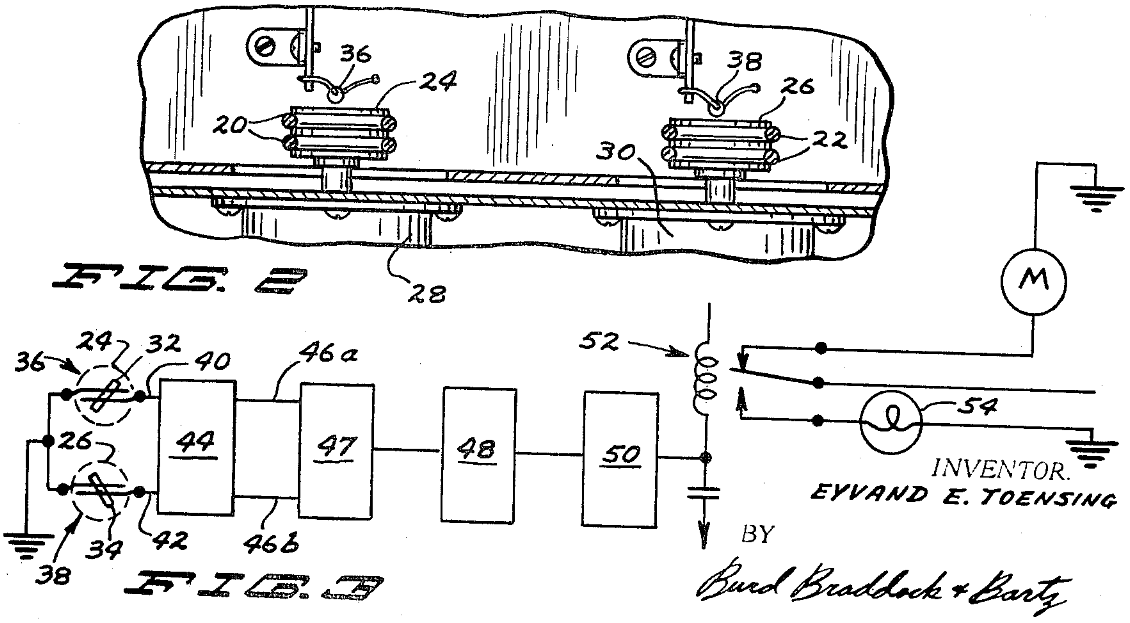
FIG. 2 is a side plan view along lines 2—2 of FIG. 1.
FIG. 3 is an electrical schematic diagram of a stop control for the tape recorder.

Referring now to FIG. 3, the magnetic reed switches are connected to the inputs 40 and 42 of a bistable multivibrator or flip flop 44. The inputs are associated with different stable states of the flip flop and operation of the switches 36 and 38 drive the flip flop between the stable states in a conventional manner. Outputs 46*a* and 46*b* of the flip flop 44 produce a signal each time the flip flop changes from one stable state to the other. An OR gate 47, well known in the logic art is coupled to the output 46*a* and 46*b* of the flip flop. The output of the OR gate is an impulse with each reversal of the stable state of the flip flop. The OR gate drives a single shot multivibrator 48 with each impulse The single shot multivibrator controls a relay driver circuit 50 which controls the operation of the relay 52 in the power supply circuit of the various drive motors of the tape recorder. A pilot lamp 54 can be provided to signal the machine operator that the various drive motors have been shut off.

The multivibrator 48 provides a predetermined time delay in the operation of the relay driver at the time the OR gate indicates the cessation of movement of the bar magnets in relation to the magnetic reed switches. As long as the single shot multivibrator is periodically pulsed the relay driver 50 will continue to allow power to be provided to the various drive motors of the tape recorder including the take-up reel, the capstan, and the supply reel. Thus at such time as the tape ceases to move at either the supply reel or take-up reel, the power supply to all of the motors in the tape recorder is shut off. In a cassette recorder, both tape reels stop when the tape reaches the end of a reel, because the tape is positively secured to both reels, and power is shut off instantly. In a conventional reel to reel recorder a slight time delay occurs at the end of the winding operation as the supply reel slows and stops.

One advantage of this invention is that no switching of the stop control circuit is required when the mode of operation of the tape recorder is changed. This is as a result of the fact that the magnetic reed switches are not directionally sensitive to the tape recorder's operation, the only requirement of the circuitry being that the flip flop be pulsed from both switches periodically. The time delay will be adjusted so that the circuit will work in the record and playback modes. Consequently the stop control is always in operation to protect the tape recorder and tape from damage.

Another advantage of this invention is that the location of motion sensing devices at a pair of locations in the tape recorder provides a stop control which operates effectively to prevent damage to the mechanism for all malfunctions as well as normal modes of operation of the machine. This stop device will also protect the tape recorder and tape in the event that the tape should break and the tape recorder will not continue to function in either the record or playback mode giving the user the impression it is working when it is not working.

It will be appreciated that the provision of a plurality of magnets in the pulleys 24 and 26 will provide more signal pulses per revolution. The provision of more pulses at the input to the flip flop will allow an increase in circuit sensitivity characterized by shortening the multivibrator time constant, allowing the circuit to shut off more quickly when motion ceases.

The embodiments of the invention in which an exclusive property or privilege is claimed are defined as follows:

1. A stop control system for a transport device for transporting an elongated member from one reel to another reel comprising:

a pair of switches, one of said switches associated with one of said reels, and the other of said switches associated with the other of said reels each switch producing a periodic signal in response to rotational movement of its associated reel,, a bistable flip-flop having two state controlling inputs each input associated with a different stable state to cause the flip-flop to change to the other stable state, said inputs being connected to said switches, said flip-flop having an output which produces a signal each time the state of the flip-flop is changed, and means, connected with said output of said flip-flop for stopping said transport device when said flip-flop remains in a stable state.

2. The apparatus of claim 1 and further comprising a time delay device connected between said flip flop and said means for stopping said transport device, said time delay device causing a predetermined time delay between the cessation of operation of said flip flop and the actuation of said stopping means.

3. The apparatus of claim 1 wherein said switches are magnetic reed switches responsive to magnets rotating in association with said reels.

4. A stop control for a transport device for transporting an elongated continuous member from a point of origin to a point of termination comprising:

a pair of motion sensing switches, each producing an intermittent signal in response to movement of said member, one switch associated with the point of origin to sense the movement of said member therefrom, and the other switch associated with the point of termination to sense the movement of said member thereto, a flip-flop having a pair of inputs, one of said switches being connected to one input and the other switch connected to the other input, said inputs being activated by said switches to drive the flip-flop between two stable states, one stable state associated with each input respectively, means for producing a control signal, said means being responsive to the periodic reversal of said flip-flop to produce a control signal when said flip-flop remains for a predetermined period of time in one of its stable states indicating that motion of said member has ceased, and means responsive to said control signal for stopping the transport device when said signal indicates a cessation of member movement.

* * * * *